US006736159B2

(12) United States Patent
Becker

(10) Patent No.: US 6,736,159 B2
(45) Date of Patent: May 18, 2004

(54) BEVERAGE TAP

(75) Inventor: Carl Meinhard Becker, Ratingen (DE)

(73) Assignee: CMB Schankanlagen GmbH, Krefeld (DE)

( * ) Notice: Subject to any disclaimer, the term of this patent is extended or adjusted under 35 U.S.C. 154(b) by 186 days.

(21) Appl. No.: 10/056,652

(22) Filed: Jan. 24, 2002

(65) Prior Publication Data

US 2002/0108651 A1 Aug. 15, 2002

(30) Foreign Application Priority Data

Feb. 14, 2001 (DE) ........................................ 101 07 111

(51) Int. Cl.[7] ................................................ F16K 27/12
(52) U.S. Cl. ........................ 137/375; 137/801; 222/183
(58) Field of Search ................................ 137/375, 801; 222/183; 251/368

(56) References Cited

U.S. PATENT DOCUMENTS 3,752,192 A * 8/1973 Kleppin ...................... 137/802
3,796,380 A * 3/1974 Johnson et al. .......... 239/590.5
4,884,596 A * 12/1989 Byers et al. ................ 137/801
5,232,129 A * 8/1993 Guerra ........................ 222/183
6,158,626 A * 12/2000 Guerra et al. ............... 222/183

FOREIGN PATENT DOCUMENTS

| | | |
|---|---|---|
| AT | E 38 506 B | 5/1989 |
| DE | 34 26 026 C 2 | 7/1993 |
| GB | 790140 | 2/1958 |

* cited by examiner

*Primary Examiner*—A. Michael Chambers
(74) *Attorney, Agent, or Firm*—Proskauer Rose LLP

(57) ABSTRACT

The invention relates to a beverage tap. The tap consists of an outer injection-molded plastic casing, into which a multi-part special steel inner part is securely pressed with a snug fit. The inner part consists of a tubular special steel part (1*a*) with a fitting (2), against which a tubular special steel part (3*a*) of a spout (3) is placed to the side in a liquid-tight manner, and in which a fixture (4*a*) for a ball joint (4*a*) of the control element (4) of the shutoff valve is held with a snug fit to the side by means of a swivel nut (5*a***).

6 Claims, 2 Drawing Sheets

BEVERAGE TAP

BACKGROUND OF THE INVENTION

The invention relates to a beverage tap with a base element whose one end has a fitting, and whose other end accommodates a spout, wherein a controllable valve through which the beverage passes is situated between the fitting and spout.

Taps of this kind are known from practice in many designs. In most known taps of this kind, the base element with its fitting and spout are often designed as a single unit, and consist of metal. Brass is often used as the metal, and can be coated with chrome or gold on the outside. One problem encountered when using such taps is that they are hard to clean. Verdigris can form in hard-to-reach locations. In addition, such taps are expensive to make.

SUMMARY OF THE INVENTION

The object of the invention is to provide a visually appealing, inexpensive to manufacture tap that is easy to clean.

This object is achieved according to the invention by a tap of the kind mentioned at the outset by having the tap exhibit an injection-molded plastic casing, into which a special steel part of the base element with its fitting and a tubular special steel part of the spout are securely pressed with a snug fit, wherein the tubular special steel part of the spout is connected in a liquid-tight manner with the tubular special steel part of the base element.

The tap according to the invention made of plastic outside and special steel outside ensures the inexpensive manufacture of a visually appealing tap, because the plastic casing that is important in terms of appearance can be molded into visually appealing shape, without this being associated with any high costs. The inner part that comes into contact with only the beverage is made only of special steel, so that this part can be optimally designed from the standpoint of hygiene and production techniques, in particular cleaning aspects.

In one embodiment of the invention, a special steel fixture for the control element of the valve body is securely inserted in the side of the tubular special steel part of the base element. However, it is advantageous for this fixture to rest in a form-fitting manner in the special steel part of the base element and plastic casing, as this additionally fixes the base element relative to its snug fit in the plastic casing.

In the simplest case, the tap exhibits only a shutoff valve for beverage flow. However, to influence the dispensing quality, the tap can additionally have a butterfly valve in the tubular base element in the direction of flow in front of the shutoff valve, wherein the butterfly valve can be adjusted with a controller located on the outside of the tap. Such a butterfly valve can be used to generate a head while dispensing Pilsner beer in a comparatively short amount of time.

The injection-molded plastic casing is preferably provided with an outer decorative finish. The decorative finish usually consists of metal, in particular chrome or gold.

BRIEF DESCRIPTION OF THE DRAWINGS

The invention will be explained in greater detail below based on one of two embodiments. Shown on.

DETAILED DESCRIPTION OF THE INVENTION

Figure 1:
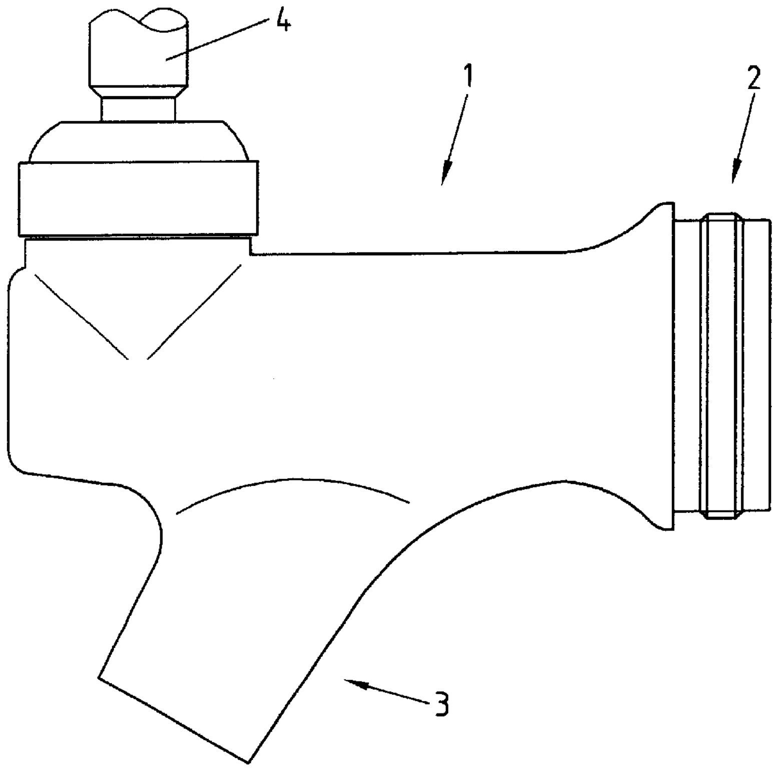
FIG. 1 is a complete tap for beverages, side view.
Figure 2:
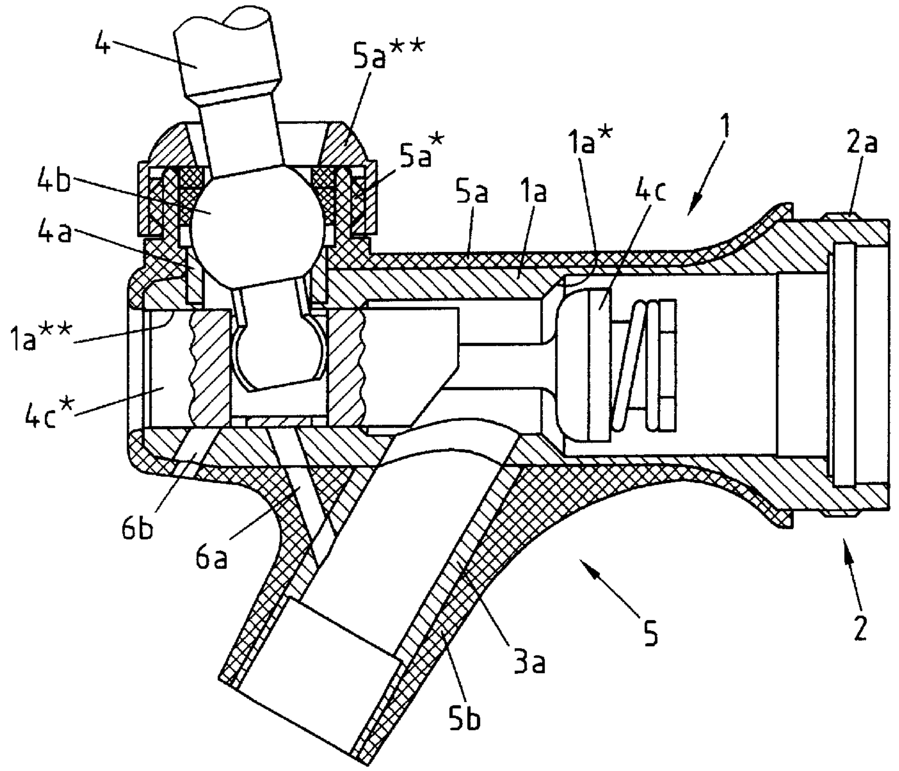
FIG. 2 is a tap according to FIG. 1, with a flow vale and tap lever, axial cross section.

The tap according to FIGS. 1 and 2 consists of a base element 1 with a fitting 2 located at one and a spout 3 resting laterally inclined against the base element 1, and a flow valve, of which FIG. 1 essentially depicts only a control element 4 located on the side of the base element 1 in the form of a swiveling tap lever. The special feature of such a tap according to the invention is that it consists of plastic outside and special steel outside.

As shown on FIG. 2, the base element 1 consists of an inner, tubular special steel part 1*a*, which at one end consists of a piece having a fitting 2 with screw thread 2*a*, and against which a tubular special steel part 3*a* of the spout 3 is laterally placed in a liquid-tight manner. The liquid-tight connection can be an adhesive bond. In addition, a special steel fixture 4*a*for a ball joint 4*b* of the control element 4 of the shutoff valve sits with a snug fit to the side in the tubular special steel part 1*a*. A venting channel 6*a* emptying in the tubular special steel part 3*a* of the spout 3 and a venting channel 6*b* open to the atmosphere branch from the end of the tubular special steel part 1*a* of the base element 1 lying opposite the fitting 2.

The flow valve is comprised of a valve body 4*c* located in the special steel part 1*a* of the base element 1 so that it can move axially and a valve seat 1*a formed in the special steel part 1. It is routed in a guide 1*a* of the special steel part 1*a* with an axially placed peg 4*c. The controller 4 resembling a lever, which engages a recess in the peg 4*c, can be used to adjust the valve body 4*c*.

The outside of the tap consists of a plastic casing 5. The outwardly essentially cylindrical special steel part 1*a* of the base element 1 sits securely and snugly in a corresponding tubular part 5*a* of the plastic casing 5. The fixture 4*a* sitting snugly to the side in the tubular special steel part 1*a* also extends in a laterally molded-on connection piece 5*a of the casing 5, so that this fixture 4***a* initiates a positive interlock between the tubular special steel part 1*a* and the casing 5. The control element 4 of the shutoff valve is held on a ball joint 4*a* with a swivel nut 5*a* in the connection piece 5*a of the casing 5.

The tubular special steel part 3*a* of the spout 3 sits snugly in an inclined molded-on tubular part 5*b* of the plastic casing 5.

The multi-part tap is assembled in such a way that the tubular special steel part 1*a* is first pressed into the corresponding tubular part 5*a* of the injection-molded plastic casing 5. The fixture 4*a* is then placed inside. The tubular special steel part 3*a* for the spout 3 is then placed inside, wherein the face is provided with an adhesive, so that a liquid-tight bond is established between the tubular special steel part 3*a* of the spout 3 and the tubular part 1*a* of the base element.

Figure 3:
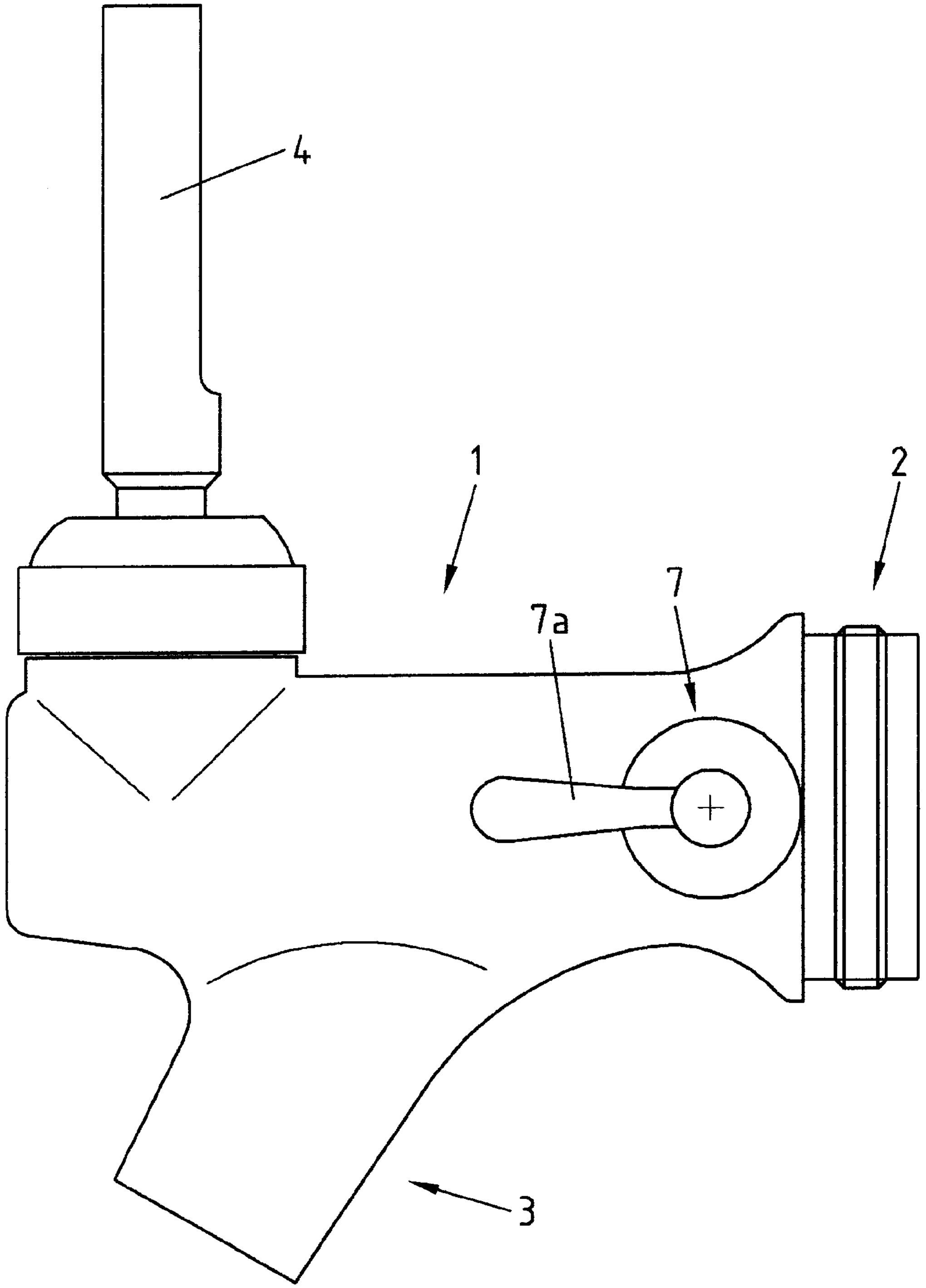
FIG. 3 is a complete tap that is additionally provided with a butterfly valve relative to the tap on FIG. 1.

The embodiment on FIG. 3 only differs from that on FIG. 1 and 2 in that a butterfly valve 7 with a control element 7*a* secured to the side of the base element 1 is provided in the direction of flow in front of the shutoff valve 1*a, 4***c*, 4*c**.

What is claimed is:

1. A beverage tap comprising:

(a) a base element having first and second ends, the first end having a fitting and the second end accommodating a spout, (b) a controllable shutoff valve through which a beverage passes located between the fitting and the spout, (c) an injection-molded plastic casing, (d) a tubular special steel part of the base element, (e) a tubular special steel part of the spout pressed together with the tubular special steel part of the base element in a snug fit, (f) wherein the tubular special steel part of the spout is connected in a liquid tight matter with the tubular special steel part of the base element.

2. The tap of claim 1 further comprising a special steel fixture serving as a control element of a valve body of the shutoff valve, said special steel fixture being securely inserted into a side of the tubular special steel part of the base element.

3. The tap of claim 1 further comprising a butterfly valve situated in the tubular special metal part of the base element in front of the shutoff valve relative to the direction of flow of a beverage, said butterfly valve being adjustable by a controller located on the outside of the base element.

4. The tap of claim 1 wherein the injection-molded plastic casing includes an outer decorative finish.

5. The tap of claim 4 wherein the decorative finish consists of a metal.

6. The tap of claim 5 wherein the metal is chrome or gold.

* * * * *